Patented July 30, 1929.

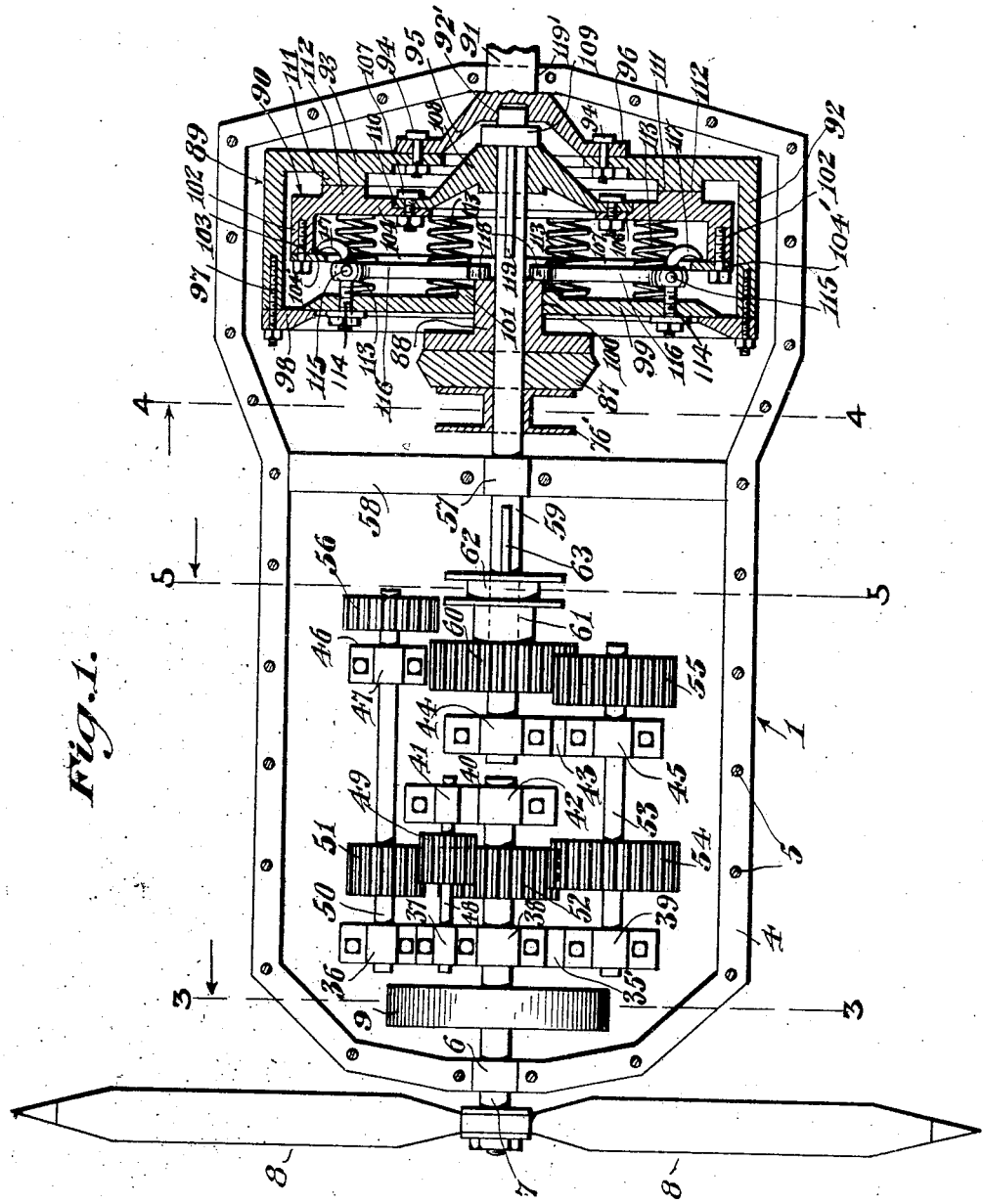

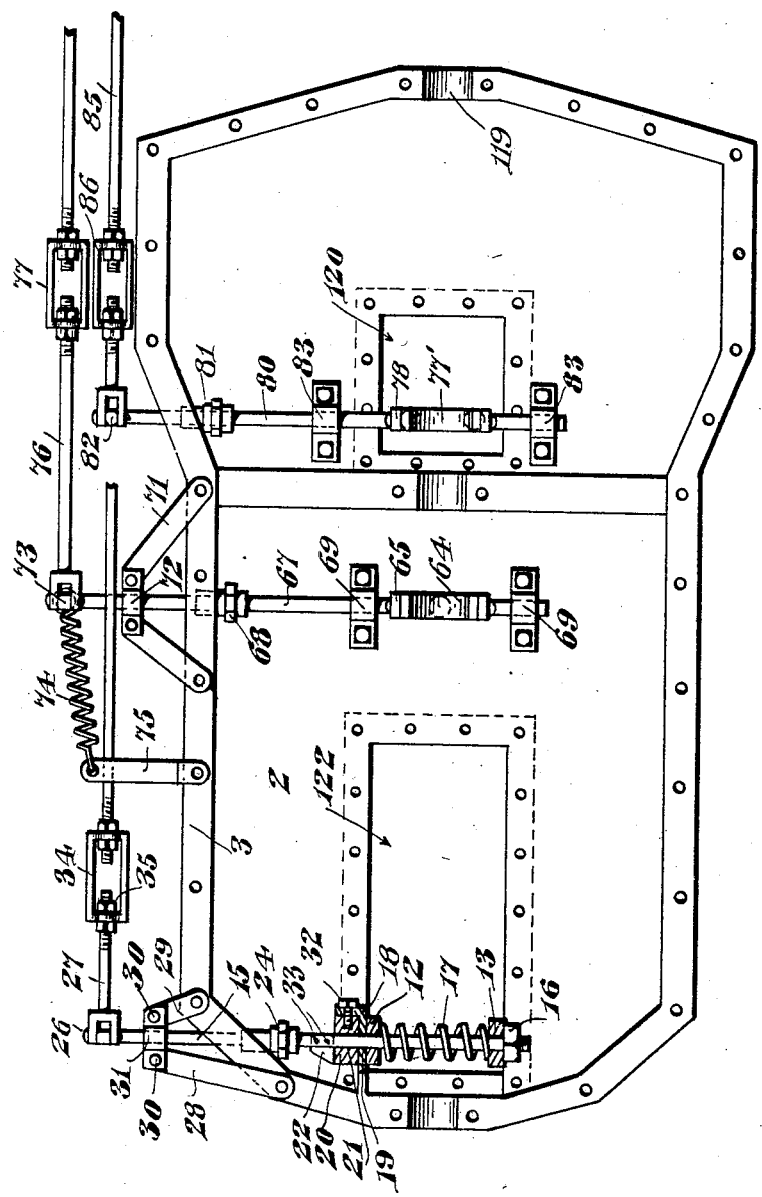

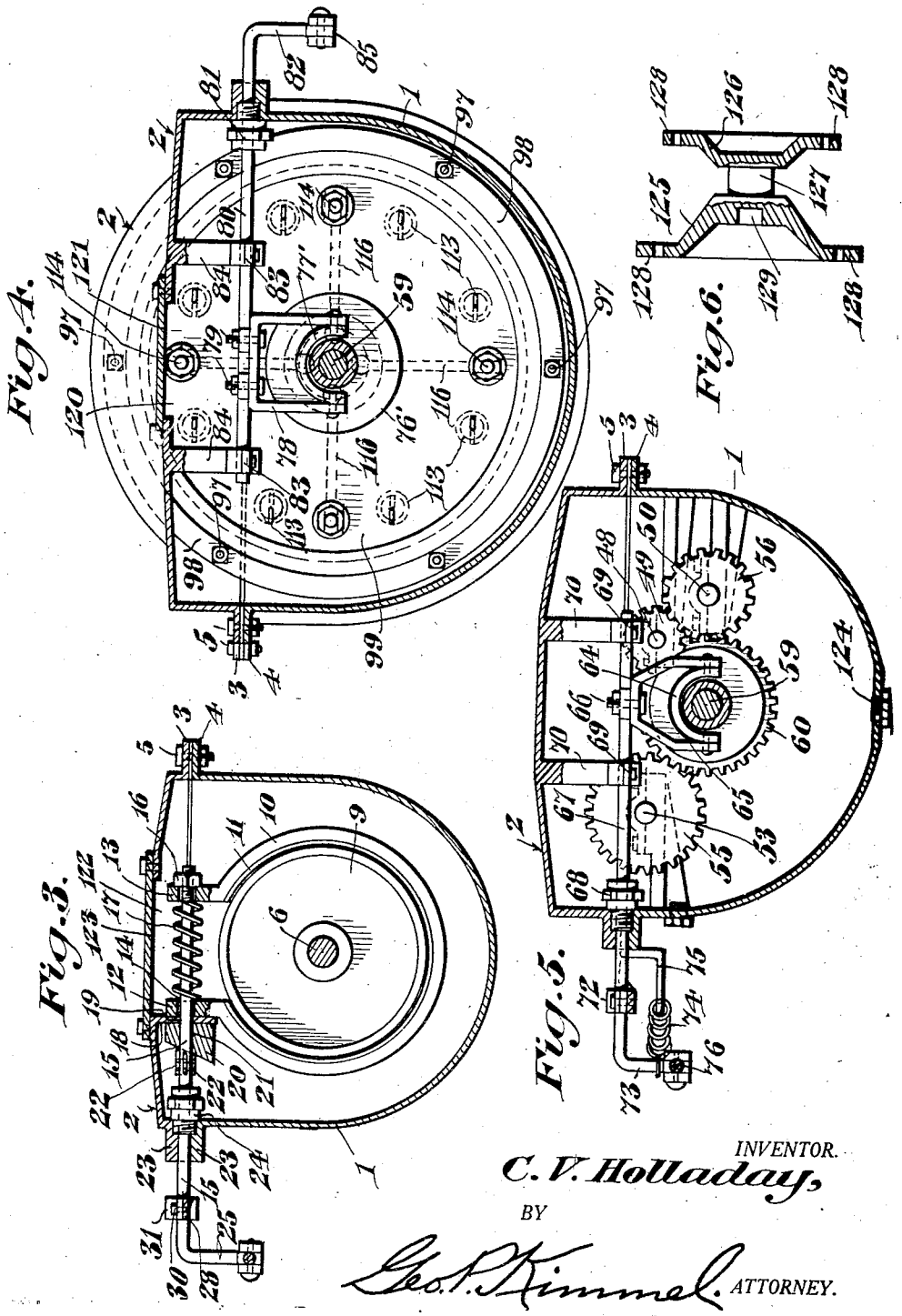

1,722,919

UNITED STATES PATENT OFFICE.

CECIL V. HOLLADAY, OF CARTHAGE, TENNESSEE.

REVERSE-SPEED UNIT.

Application filed November 10, 1927. Serial No. 232,341.

This invention relates to a reverse speed unit for aeroplanes and has for its object to provide, in a manner as hereinafter set forth, a unit of the class referred to enabling an aviator to check the speed of the aeroplane to permit of the landing thereof upon a materially smaller area or space than is now required, to make it possible for the landing of aeroplanes upon buildings and other landing points, of small area, prepared for such purpose.

A further object of the invention is to provide, in a manner as hereinafter set forth, a reverse speed unit for aeroplanes for increasing the efficiency when taking off and without necessitating the pushing or tieing up of the aeroplane.

Further objects of the invention are to provide, in a manner as hereinafter set forth, a reverse speed unit for aeroplanes for the purpose referred to and which is comparatively simple in its construction and arrangement, strong, durable, compact, thoroughly efficient in its use, conveniently controlled, readily assembled, and comparatively inexpensive to set up.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a sectional plan of a reverse speed unit, in accordance with this invention, and with the upper housing section removed.

Figure 2 is an inverted plan of the upper housing section and further illustrating certain elements of the unit connected therewith.

Figure 3 is a section on line 3—3 Figure 1 with the upper and lower housing sections in position.

Figure 4 is a section on line 4—4 Figure 1 with the upper and lower housing sections in position.

Figure 5 is a section on line 5—5 Figure 1 with the upper and lower housing sections in position.

Figure 6 is a sectional detail illustrating a coupling connection between the fly wheel and driving shaft therefor.

Referring to the drawings in detail 1 generally indicates the lower section of a housing and 2 generally indicates the upper section of a housing. The sections 1 and 2 have opposed flanges 3, 4 secured together by holdfast devices 5. The section 1 centrally of its forward end is provided with a bearing 6 for the driving shaft 7, of a propeller 8 fixed to the outer end of the shaft 7 and spaced from the housing section 1. Carried by the shaft 7 in proximity to the forward end of the housing section 1 is a brake drum 9 and surrounding the latter is a brake band 10 provided with a lining 11. The band 10 at each end is formed with an angularly disposed apertured lug and said lugs are indicated at 12, 13 and the aperture in each of said lugs at 14. Extending through the lugs 12, 13 is a brake shaft 15 carrying on its inner end a nut 16 having threaded engagement therewith and abutting against the lug 13. Mounted on the shaft 15 and interposed between the lugs 12, 13 is a coiled controlling spring 17. The upper housing section 2 is formed with a depending flange 18 which abuts against the lug 12 and is formed with an aperture 19 for the passage of the shaft 15. Carried by the flange 18 is a beveled block 20 having an opening 21 which registers with the aperture 19 through which extends the shaft 15. Carried by the shaft 15 is a beveled lug 22 which rides against the beveled face of the block 20 for forcing the shaft 15 outwardly to apply the brake band 10 to the drum 9. The housing sections 1 and 2 are provided with grooved enlargements 23 which have secured therein a bushing 24 for the shaft 15 and said bushing extends into the housing. The shaft 15 projects outwardly from the enlargement 23 and is provided with a crank or brake arm 25, pivotally connected as at 26 to an adjustable brake rod 27. Projecting from the housing and secured between the sections thereof are supporting arms 28 and 29, which are fixed as at 30, to a guide 31 for the shaft 15. The block 20 is secured to a flange 18 by holdfast devices 32. The flange 18 is of an angle shape. See Figure 2. The holdfast devices for securing the lug 22 to the shaft 15 are indicated at 33. See Figure 2. The brake rod is formed of a pair of sections adjustably connected together by a turn buckle 34 and the sections of the brake rod carry stop and clamping nuts 35 for the turn buckle 34. The sections of the brake rod are threaded for the reception of the nuts. The turn buckle 34 also threadedly engages with the sections of the brake rod.

Positioned within the lower housing section 1 is a support 35′ having secured to the top thereof bearings 36, 37, 38 and 39. Arranged within the lower housing section 1 and spaced from the support 35′ is a support 40 having secured to the top thereof bearings 41 and 42. Spaced from the support 40 and arranged within the housing section 1 is a support 43 having secured to the top thereof bearings 44 and 45. Arranged within the housing section 5 rearwardly of and to one side of the support 43 is a support 46 having a bearing 47 secured to the top thereof. The shaft 7 is mounted in the bearings 38 and 42. Mounted in the bearings 37, 41 is a floating shaft 48 for reverse speed and which carries a floating gear 49 for reverse speed. Mounted in the bearings 36, 47 is a reverse speed shaft 50 carrying a reverse gear 51. Secured to the shaft 7 is the main driving gear 52 therefor. Mounted in the bearings 39, 45 is the forward drive shaft 53 provided with the forward drive gears 54, 55. Carried by the shaft 50 is a reverse speed gear 56. Mounted in the bearings 44 and in a bearing 57 carried by a partition member 48 is a sliding gear shaft 59. Mounted on the shaft 59 for forward and reverse speed is a gear 60 carrying an extended hub 61 provided with a gear shift collar 62. The shaft 59 carries a key 63 for coupling therewith the gear 60 and its extended hub 61. The gears 49, 51, 52 and 54 mesh with each other. The gear 60 is adapted to be shifted to mesh with the gear 55 or the gear 56. The gear arrangement referred to provides a transmission.

Positioned within the collar 62 is a gear shift fork 64 carried by a yoke 65, connected as at 66 to a gear shift shaft 67, which extends through a bushing 68 secured between the sections of the housing. The shaft 67 is mounted in bearings 69 carried by hangers 70 which depend from the inner face of the upper section 2 of the housing. Outwardly extending supporting arms 71 are fixed between the housing sections and are secured to a combined guide and bearing 72 for the shaft 67. The outer end of the shaft 67 terminates in a crank arm 73, to which is attached a controlling spring 74 connected to an angle shaped bracket 75 which is secured between and projects from the housing sections. Connected to the crank arm 73 is an operating rod 76 therefor and which consists of a pair of sections adjustably connected by a turn buckle 77.

Slidably mounted on the shaft 59 is a clutch collar 76′ and positioned therein is a fork 77′ carried by an inverted yoke 78 which is secured, as at 79 to a clutch shifting shaft 80. Secured between the housing sections and extending inwardly is a bushing 81 which constitutes a bearing for the shaft 80 and the latter projects a substantial distance from the housing and is provided with a crank arm 82. The shaft 80 is mounted in bearings 83 carried by hangers 84 which depend from the inner face of the upper section 2 of the housing. An operating rod 85 is connected to the crank arm 82 and said rod is formed with a pair of sections adjustably connected by a turn buckle 86. The collar 76′ is attached to a clutch bearing 87 which carries a clutch release sleeve 88 extending into a clutching mechanism formed of an outer section and an inner section referred to generally at 89 and 90. The section 89 is carried by the power or motor shaft 91 which extends into the housing at the rear end thereof. The section 90 is shiftable on and keyed to the shaft 59.

The section 89 consists of an annular body portion 92 having integral at one end with an inwardly extending annulus 93, and fixed to the annulus 93, by the holdfast devices 94, is a truncated cone shaped coupling member 95 which is fixed to the shaft 91 and is formed with a socket 92′ in its inner face. The member 95 is hollow and formed with an annular flange 96 through which extend the holdfast devices 94. Secured to the inner end of the body portion 92, by the holdfast devices 97 is an annulus 98 having its inner diameter greater than the inner diameter of the annulus 93. Positioned against the inner face of the annulus 98 is a closure plate 99 provided with an opening 100 for the passage of the sleeve 88. The inner face of the plate 99 is formed with an annular boss 101 which surrounds the opening 100.

The section 90 comprises an annular body portion 102 of less diameter than the diameter of the body portion 92 and the latter in cross section is of greater length than the body portion 102. Secured to the rear end of the body portion 102, by the holdfast devices 103 is an annulus 104′ which extends inwardly from the inner face of the body portion 102. Formed integral with the forward end of the body portion 102 is an inwardly extending annulus 104 having its inner diameter materially less than the inner diameter of the annulus 104′. The annulus 104 is rabbeted as at 106. Secured to the rabbeted portion of the annulus 104, by the holdfast devices 107, is a hollow, truncated, cone shaped coupling member 108 which provides means for slidably connecting the section 90 to the shaft 59 and the latter extends into the socket 92 and carries a peripheral, circumferentially extending boss 109 which is interposed between the coupling members 95 and 108 thereby maintaining them in spaced relation. The coupling member 108 is formed at its rear with an annular flange 110 through which extend the holdfast devices 107. The rear face of the annulus 93 is formed with an annular shoulder 111 of substantial thickness and cross sectional length and which opposes an annular shoulder 112 formed on the forward face of the annulus 104. The shoulder 112 is of the same area as the shoulder 111 and said shoulders when in abutting relation have their inner and outer edges flushed. See Figure 1.

Interposed between the plate 99 and the rear face of the annulus 104, as well as abutting against the plate and said annulus is a series of spaced controlling springs 113.

Secured to the plate 99 and extending towards the annulus 104' is a plurality of spaced supports 114 having pivotally connected therewith, as at 115 clutch release arms 116 and each of which is formed with a hook shaped extension 117 for engagement with the annulus 104'. The extensions 117 are positioned at the outer ends of the arms 116 and said outer ends are pivoted to the supports 114. The inner ends 118 of the arms 116 seat against the clutch release sleeve 88. The key carried by the shaft 59 and which associates with the coupling member 108 is indicated at 119. The springs 113 normally maintain the plate 99 against the annulus 98. The springs 113 further normally maintain the shoulders 111 and 112 in clutching engagement and also the boss 109 in clutching engagement with the coupling members 95 and 108.

The annulus 93 in connection with the body portion 89 constitutes a fly wheel. The coupling member 95 provides the fly wheel hub. The socket 92 is a bearing for the shaft 59. The main fly wheel bearing is indicated at 119' and is formed in the sections of the housing. The upper section 2 is formed with an opening 120 for the purpose of seeing the clutch mechanism and such opening is normally closed by a plate 121. The upper section 2 is also provided with an opening 122 so that the transmission can be viewed or access can be had thereto and said opening 122 is normally closed by a plate 123. The transmission operates in oil as well as the other elements within the housing. The shoulders 111, 112 constitute friction rings. The elements 27, 76 and 85 are in convenient reach of the pilot. Housing section 1 has a drain plug 124.

With respect to the operation of the device or unit it will be said that for descending, release clutch by pulling the clutch release rod 85, which causes the yoke 78' to press clutch release fork 77' against clutch collar 76', that having action on clutch bearing 87, which forces clutch springs 113 together by pulling down plates 99 and picking up on release hook 117. This action releases plate 99 from the fly wheel rim or clutch cover 92 and also releases the shoulders 111 and 112 thereby freeing the shaft 59 from the motor and this position is held until movements two and three, to be presently referred to have been executed. With respect to movement two apply brake sufficiently to cause the propeller and gears to stop motion. As to movement three the gear 60 is moved in engagement with gear 65 and this movement is continued until gear 60 meshes with gear 56. At this time clutch is released whereby the shaft 59 is coupled with the fly wheel and which results in the reverse of the propeller movement, as gear 60 will rotate gears 56, 51 and 49 which will have action on main propeller, driving gear 52 and on completion of this movement one gets the reversed motion as a result, and to change back to a forward movement it is only necessary to restore the parts to their original position.

In Figure 6, a coupling connection for securing the fly wheel to the motor or driving shaft is shown, and which consists of a pair of oppositely disposed hollow, flanged truncated cone shaped heads 125, 126 connected together by a short shaft 127. The head 125 is of greater diameter than the head 126 and is adapted to be secured to the fly wheel. Head 126 is to be coupled to the motor or driving shaft not shown. Short shaft 127 is to be positioned in bearing 119'. The flanges 128 of the heads are apertured for the passage of hold fast devices. Head 126 has a socket 129 for reception of shaft 59.

It is thought the many advantages of a reverse speed unit for aeroplanes and for the purpose referred to can be readily understood, and although the preferred embodiment of the invention is as illustrated and described, yet it is to be understood that changes in the details of construction can be had which fall within the scope of the invention as claimed.

What I claim is:

A reverse speed unit comprising a driven shaft provided with a driving gear therefor intermediate the ends thereof, a pair of parallel, spaced, transmission shafts, one of greater length than the other and having its rear end arranged rearwardly of the rear end of the other of said pair of shafts, a forward and a rear gear on each transmission shaft, the gears in one transmission shaft being of greater diameter than those on the other, the said rear gears arranged at the rear ends of the transmission shafts, a power shaft aligning with and spaced from the rear end of the driven shaft, a power transmitting sliding gear mounted on the power shaft, means for shifting said sliding gear to selectively engage and drive said rear gears, a floating shaft having an idler gear permanently meshing with one of said forward gears and said driving gear, the other of said forward gears permanently meshing with said driving gear, a support common to the forward ends of said transmission and floating shafts and to said driven shaft, a support common to the rear ends of the driven and floating shafts, a support for the rear of one of the transmission shafts, and a support common to the forward end of the power shaft and the rear end of the other transmission shaft.

In testimony whereof, I affix my signature hereto.

CECIL V. HOLLADAY.